United States Patent
Orkin et al.

[11] 3,904,731
[45] Sept. 9, 1975

[54] MOLDED PLASTIC BEARING ASSEMBLY

[75] Inventors: Stanley S. Orkin, Rockville; Edward John Nagy, Windsor, both of Conn.

[73] Assignee: Kamatics Corporation, Bloomfield, Conn.

[22] Filed: Nov. 8, 1973

[21] Appl. No.: 414,101

Related U.S. Application Data

[62] Division of Ser. No. 241,007, April 4, 1972, Pat. No. 3,806,216.

[52] U.S. Cl............. 264/242; 29/149.5; 260/89.5 R; 260/884; 264/261; 264/263; 308/238
[51] Int. Cl............................................... B32b 1/10
[58] Field of Search ........... 264/242, 263, 264, 261; 308/241, 2 R, 238; 260/89.5 R, 884; 29/149.5

[56] References Cited
UNITED STATES PATENTS

| | | | |
|---|---|---|---|
| 2,865,692 | 12/1958 | Gossmann | 264/242 |
| 2,998,397 | 8/1961 | Riesing | 308/238 |
| 3,081,644 | 3/1963 | Hudgens et al. | 264/264 |
| 3,094,376 | 6/1963 | Thomas | 264/242 |
| 3,218,305 | 11/1965 | Krieble | 260/89.5 R |
| 3,218,383 | 11/1965 | White | 264/242 |
| 3,704,264 | 11/1972 | Gorman | 260/89.5 R |

*Primary Examiner*—Jeffery R. Thurlow
*Attorney, Agent, or Firm*—Cushman, Darby & Cushman

[57] ABSTRACT

A bearing assembly comprises two engaging members movable relative to one another. One of said members has a bearing surface made of metal or ceramic coated with a thin film of a parting agent, and the other bearing surface is a cured mixture of a curable acrylate composition and particulate polytetrafluoroethylene.

13 Claims, 7 Drawing Figures

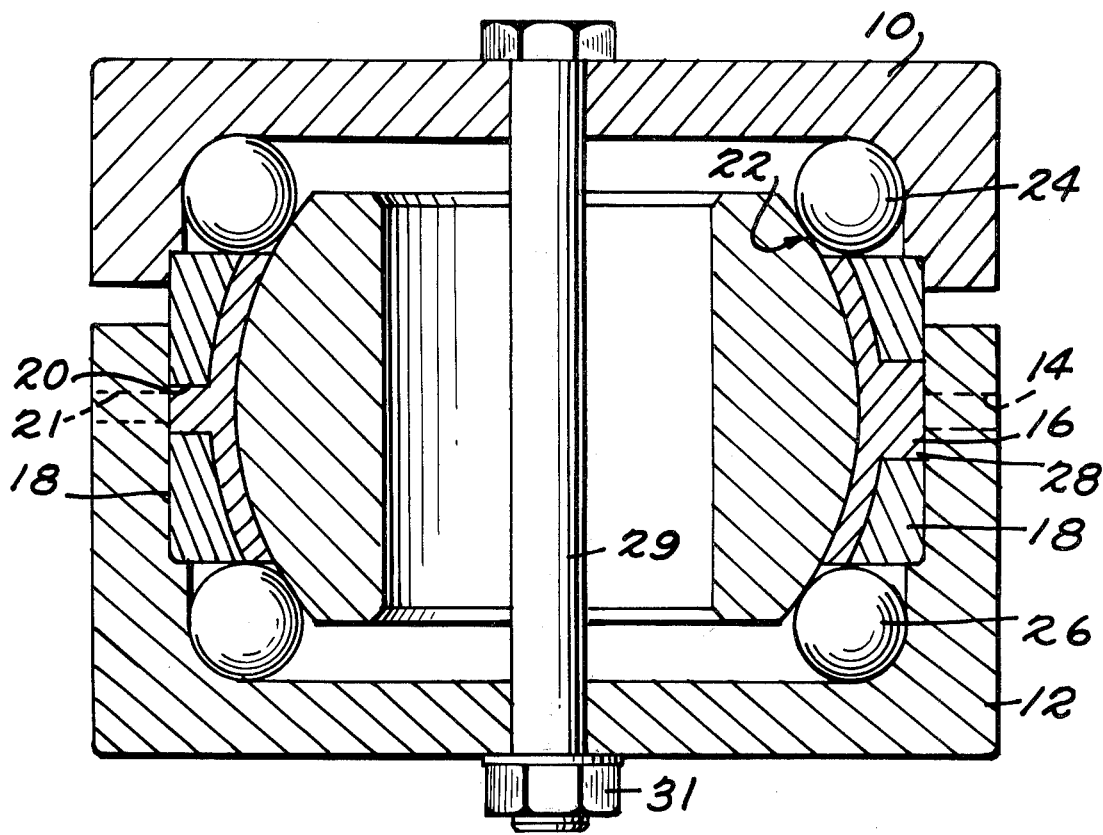
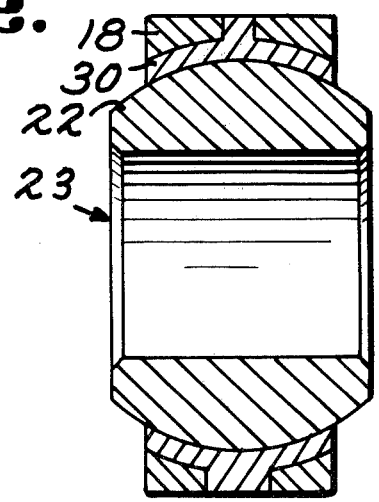
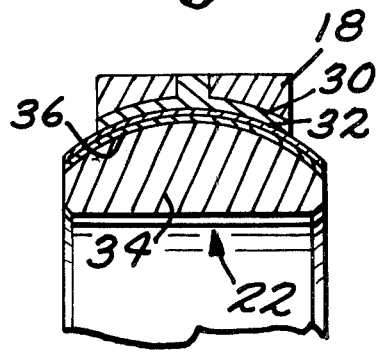

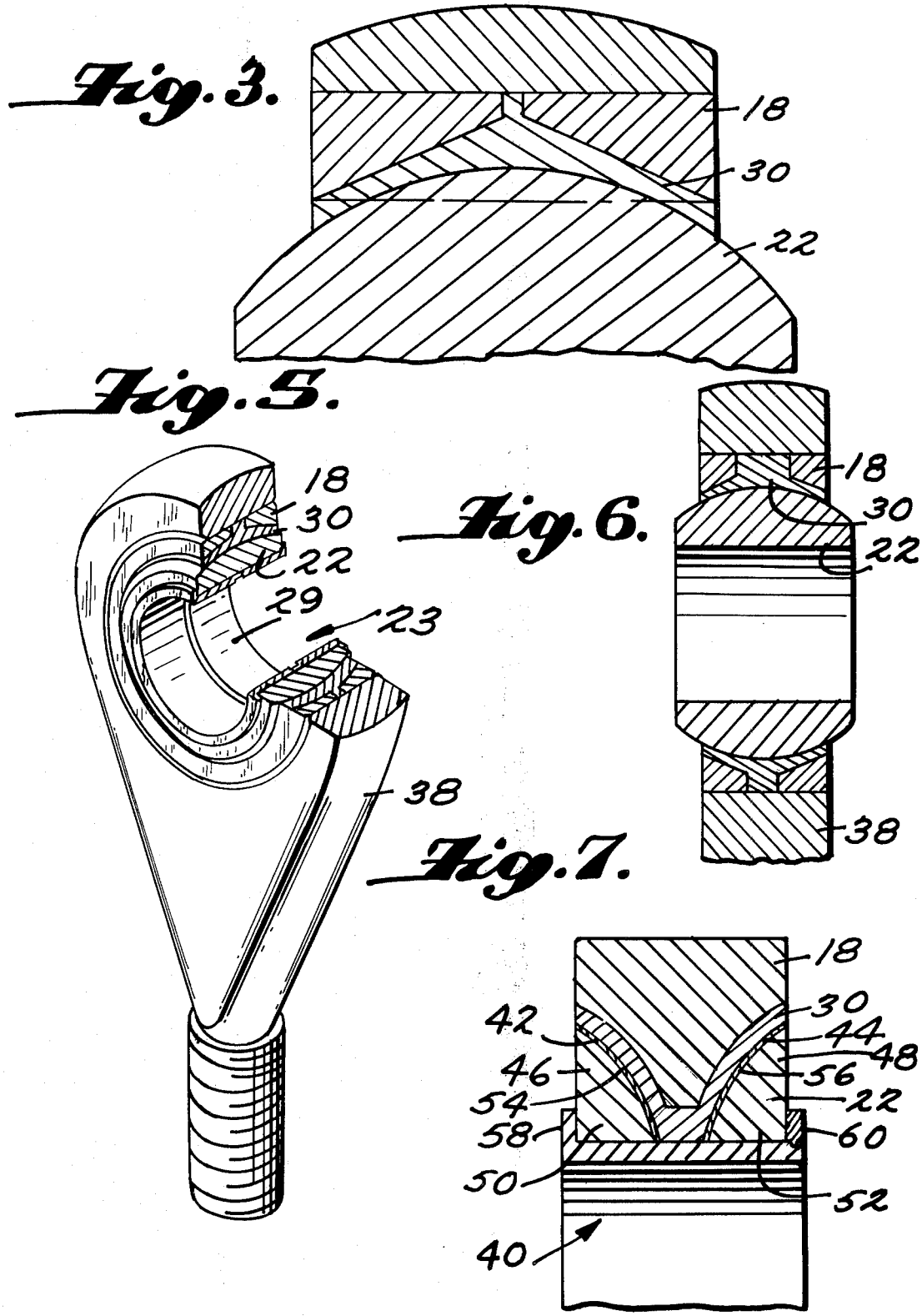

MOLDED PLASTIC BEARING ASSEMBLY

This is a division, of application Ser. No. 241,007 filed Apr. 4, 1972 now U.S. Pat. No. 3,806,216, issued Apr. 23, 1974.

The present invention relates to a molded selflubricating bearing assembly and particularly to a selflubricating bearing assembly capable of absorbing radial, axial and moment loading, individually, or in combination.

In the past, efforts to produce a molded bearing assembly comprising an inner bearing member and a molded outer plastic race have not been altogether satisfactory. In certain instances, excessive looseness between the freely rotatable inner bearing member and the plastic outer race is experienced. In other instances, the plastic material after injection about the inner bearing member tends to shrink around the inner bearing member, thereby causing a lock up of the plastic race on the inner bearing member. This latter phenomenon seriously interferes with the normal desired relative movement between the bearing members.

Representative of prior art molded bearing assemblies include those described in U.S. Pat. Nos. 2,970,869 and 3,094,376 to Thomas and 3,287,071 to Tucker. In accordance with Thomas' U.S. Pat. No. 2,970,869, a plastic material is injected under pressure within a housing enclosing a member so that the plastic conforms to the member and on hardening forms both a rigid supporting backing and a bearing surface for the member. Plastic materials disclosed for use in this patent are polyethylene, phenolic impregnated glass fibrous material, nylon and a phenolic-polyethylene impregnated glass fibrous material.

In Thomas' U.S. Pat. No. 3,094,376, a relatively thin coating of polytetrafluoroethylene or nylon is applied to the surface of a ball retained in a housing. A hardenable backing material is then injected into the housing, around the polytetrafluoroethylene or nylon, under heat and pressure to entirely fill the space within the housing so that ultimately there is no relative movement between the hardened backing material and the polytetrafluoroethylene or nylon, the latter being in rotative engagement with the ball. Materials used to form the injected backing member are phenolic impregnated glass fibrous material, nylon and a phenolic-polyethylene impregnated glass fibrous material.

An even more recent development in the molded bearing art is U.S. Pat. No. 3,287,071 to Tucker who injects, under a pressure of about 1000 psi, a heated, liquefied low shrink plastic material about an inner bearing member disposed within and spaced from a housing member so that when the plastic material is set it forms a race for the inner bearing member and is in line-to-line rotatable engagement therewith but in nonrotative engagement with the wall surface of the housing, generally by means of a keying element extending radially through the housing member and integral with the plastic race. The low shrink plastic material disclosed in this patent is 20% glass filled nylon.

Contrary to these prior art molded bearing assemblies which utilize, as the plastic material for producing a molded race or bearing member, a polytetrafluoroethylene or a nylon based material which requires the application of heat and/or elevated pressure in order to liquefy and to inject the same into the space surrounding the inner member, the present invention provides a bearing assembly utilizing an acrylate composition which is liquid at ambient temperature and pressure, thus permitting the formation of the outer bearing member therefrom under these conditions. Advantageously, the production of the outer bearing member at ambient temperature eliminates the absolute need to heat the plastic material to a molten state which heating operation is required in prior art methods of producing molded plastic bearings. A significant economy in production costs can thus be achieved. Further, the use of the acrylate composition in the present invention avoids the need for the addition to the plastic material of solvents to liquefy the same, as is required in prior art compositions, thus avoiding the possibility of adverse after effects resulting from driving off the solvent during the curing operation. Such adverse effects can be reflected in the introduction of undesirable play between the bearing members and/or the presence of voids in portions of the cured material.

Moreover, the use of the acrylate composition in the present invention has been found particularly advantageous, since the composition remains in a liquid state unitl it is either deprived of oxygen or raised to an elevated temperature, thus easing handling, storage and manufacturing operations involving the same and permitting, for instance, the use of injection pressures as low as about 0.25 lbs/in$^2$, when an injection operation is desired. Thus, the present invention represents a significant departure from the prior art molded bearing assemblies and from prior art methods of producing the same, while achieving equal and even superior results.

More particularly, the present invention relates to a bearing assembly comprising an inner and an outer co-engaging bearing members movable relative to one another, said inner bearing member having a bearing surface made of a member selected from the group consisting of metal and ceramic and said outer bearing being produced from a mixture of a curable acrylic composition and a solid lubricant, organic or inorganic, in particulate form.

Generally, the curable acrylate is present in amounts of about 50–70, preferably about 60 percent by weight of said mixture, the remainder being essentially said particulate solid lubricant which can be, for instance, polytetrafluoroethylene, preferably in flock form, molybdenum disulfide, graphite fibers, silver powder, lead powder, fiberglass flock and others.

The curable acrylate composition usefully employed in the present invention comprises a mixture of a compound having the formula

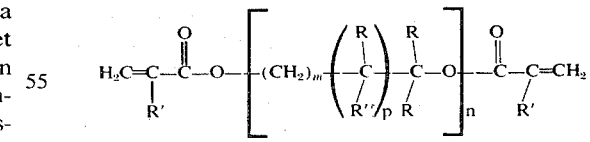

wherein

R is selected from the group consisting of hydrogen, lower alkyl containing 1–4 carbon atoms, hydroxyalkyl containing 1–4 carbon atoms and

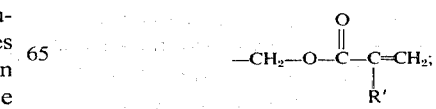

R' is selected from the group consisting of hydrogen, halogen and lower alkyl having 1–4 carbon atoms, R" is selected from the group consisting of hydrogen, —OH and

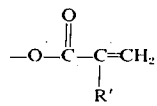

wherein R' has the meaning given above; m is an integer of 1–8; n is an integer of 1–20; and p is 0 or 1, with a small amount of a hydroperoxide catalyst, generally from about 0.1–20% by volume of said compound, characterized (1) by its ability to remain ineffective to polymerize said acrylate in the presence of oxygen at ambient temperature and to initiate polymerization of said monomer in the absence of oxygen at room temperature and (2) its ability to initiate polymerization of said acrylate in the presence of oxygen at a temperature ranging from about 100°–325°F.

Representative acrylates usefully employed in the present invention include diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, tetramethylene dimethacrylate, ethylene dimethacrylate, neopentyl glycol diacrylate and trimethylol propane triacrylate.

Suitable catalysts include hydrogen peroxide as well as nonpolymerizing organic hydroperoxides which are characterized by the fact tat the atoms directly linked to the carbon atom bearing the hydroperoixde radical are selected from the group consisting of carbon, hydrogen, nitrogen or oxygen, and in such cases where all of the said directly linked atoms are carbon, not more than two of said carbon atoms comprise the carbon atom of a methyl group. Representative organic hydroperoxides include a hydroperoxide of a hydrocarbon, an ether or of a ketone and specific catalysts include dimethyl benzyl hydroperoxide (cumene hydroperoxide), methyl ethyl ketone hydroperoxide, and hydroperoxides formed by oxygenation in the liquid phase of the following compounds: methyl butene, cetane, cyclohexene, ethylether, ethylene glycol diethyl ether, diethylene glycol dimethyl ether, tetraethylene glycol dimethyl ether, diethylene glycol, propylene glycol, ortho formate, trimethyl ortho formate, acetal, tetraethoxy propane, dioxane, paraldehyde, acetyl acetone, methyl n-hexyl ketone, methyl n-amyl ketone, isopropyl ketone, tetralin and tetra hydrocarbazol.

If desired, an accelerator, in amounts of a fraction of a percent up to 10% or more based on the volume of said compound can be used. Generally, this amount can range between about 0.05–5.0 percent by weight of the composition, preferably about 0.5–2.5 percent by weight. By way of example, representative accelerators include organic amines such as secondary or tertiary amines, organic phosphites, organic mercaptans, ascorbic acid, quaternary ammonium salts and the like. Additionally, as an accelerator, there can be employed an organic imide or formamide such as benzoic sulfimide, succinimide, phthalimide, formamide, N-substituted formamides such as N-ethyl formamide and the metallic salts of the imides such as sodium saccharin.

Additionally, if desired, the composition can also include a quinone in minor amounts, i.e. as little as 10 ppm and as great as 1000 ppm. Especially useful quinones include benzoquinones and naphthoquinones. Specifically, 1,4-benzoquinone, 2,5-dihydroxy benzoquinone, 2,5-diphenyl-p-benzoquinone, 1,2-naphthoquinone and 9,10-anthraquinone can be utilized. When a quinone or a monohydric or dihydric phenol having at least one alkyl group ortho to each hydroxy group thereof is employed in the composition it is also convenient to include a tertiary N,N-dialkyl aryl amine having the formula

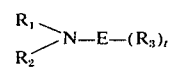

wherein E represents a carbocyclic aromatic nucleus selected from the group consisting of phenyl and naphthyl; $R_1$ and $R_2$ are lower alkyl having 1–4 carbon atoms; $t$ is one of the following: 0, or an integer of 1–5; and $R_3$ is selected from the group consisting of alkyl having 1–4 carbon atoms and lower alkoxy having 1–4 carbon atoms provided that when $R_3$ is in the ortho position, $t$ is greater than 1. There can also be used a heterocyclic secondary amine such as pyrrolidine, piperazine and 1,2,3,4-tetrahydroquinoline. Generally, the amine will be present in amounts of about 0.01–3.0 percent by weight of said compound.

Usually, the unpolymerized acrylate employed in the composition has a viscosity of 100–2500 cp, preferably about 480–720 cp at 25°C, a flash point of not less than 200°F when tested as specified in ASTM D-1310. Further, the unpolymerized acrylate is soluble in trichloroethylene or a solution of trichloroethylene containing 5 percent by volume of acetone when tested as follows: one cubic centimeter of the compound is placed in 10 cc of trichloroethylene or in 10 cc of said solution; after shaking the mix thoroughly, the solution is examined under transmitted light and is clear and free from precipitate. The polymerized composition has a static shear strength after room temperature curing of 2000 psi (minimum), generally about 2000–4000; a static shear strength after exposure to a temperature of 300° ± 3.6°F for a period of 120 ± 2 minutes of 1000 psi (minimum) and a low temperature static shear strength at −65° ± 2°F of 2000 psi (minimum).

The inner bearing member of the present invention can have a bearing surface made of a member selected from the group consisting of metal and ceramic. Thus, when the inner bearing member is metal, it is preferably stainless steel (wrought or powder metallurgy) such as 440C and 304, although other metals such as case hardened titanium and anodized aluminum can also be employed. When a ceramic surface bearing member is employed generally it is in the form of a thin ceramic coating on a metal substrate. The ceramic coating must be sufficiently thin to permit a slight deformation thereof without fracturing so that stresses which would normally build up within the coating can be transferred to the substrate which has the greater tensile strength. Furthermore, the tensile strength of the substrate must be within a particular range. If the tensile strength is too low, the substrate will not provide proper support for the coating with the resulting deformation of the substrate under load, thereby causing fractures in the ceramic coating. If the tensile strength of the substrate is too high, the substrate will not provide a proper cushioning effect, surface stresses will not be transferred to the substrate and the coating will fracture or otherwise fail as a result of such stresses. In particular, it is found that the tensile strength of the substrate should lie within the range of 35,000 to 250,000 psi to achieve a proper balance between the tendency of the coating to fracture as a result of deformation and the tendency of the coating to fracture as a result of surface stresses. Also, the coating must have a thickness ranging between 0.0005 to 0.010 inch with a thickness of approximately 0.004 inch being preferred.

The use of titanium or a titanium-based alloy as a substrate is particularly desirable since this metal provides an especially good bond with the ceramic coating. In addition, this substrate material is more chemically inert than most materials which can be used, is light in weight and maintains its strength when subjected to relatively high temperatures approaching 800°F. Also, and perhaps most important, it has a coefficient of thermal expansion substantially equal to that of the various coating materials which may be used for the ceramic coating and, therefore, little or no stresses are built up on the coating as a result of differential expansion of the substrates and the coating when operating over a wide temperature range.

The material of the ceramic coating used on the substrate may vary widely. However, it has been found that coating materials made up redominately of one or the other of five specific base compounds provide particularly good results, especially in combination with a substrate of titanium or a titanium-based alloy such as alloys which, in addition to titanium, comprise 5 percent by weight of aluminum and 2.5 percent by weight of tin (Ti-5Al-2.5Sn) or 6 percent by weight of aluminum and 4 percent by weight of vanadium (Ti-6Al-4V). The five base compounds preferred for the coating materials are: chromium oxide ($Cr_2O_3$), titanium dioxide ($TiO_2$), aluminum oxide ($Al_2O_3$), titanium carbide (TiC) and tungsten carbide (WC). Each of these compounds can be used in substantially pure form or in combination with other additives intended to produce a more desirable coating or to facilitate the application of the coating to the substrate. Examples of mixtures which can be used are: (80 percent $Cr_2O_3$ + 20 percent NiCr), (TiC + 5–20 percent Ni), (50 percent WC + 35 percent NiCr + 15 percent NiAl) and (WC + 9 percent Co), where NiCr is made up of 80 percent Ni and 20 percent Cr and wherein the percentages given are volume percentages.

The inner bearing surface, prior to injection therearound of said molded outer bearing is provided with a coating of a parting or release agent. Representative of such agents are polytetrafluoroethylene, silicone, wax emulsion and the like, said parting agent being employed to protect against any adhesion between the inner bearing member and the outer bearing member during the fabrication of the latter.

In one embodiment of the present invention, the bearing assembly is produced by locating the inner bearing member within an outer housing member with the spacing therebetween being sufficient so that on injection of the mixture of the curable acrylate and particulate solid lubricant, no appreciable separation of the latter from the mixture is experienced. It has been observed that if the gap or spacing between the inner bearing member and the outer housing is too small, such a separation occurs, thereby creating a deficiency of particulate solid lubricant in that portion of the finished or molded outer bearing member which contacts or engages the inner bearing member. This adverse phenomenon causes a diminution of the otherwise highly favorable room and elevated temperature characteristics of the bearing assembly of this invention. Generally, the spacing between the inner bearing member and the outer housing will range between about 5 to 60 mils, although it will be recognized, that depending upon the ultimate use to which the bearing assembly is put, as well as the particular configuration of the bearing assembly chosen, the maximum dimension of the spacing can be even greater.

The moldable composition of the outer bearing member can be injected into the spacing between the inner bearing member and the outer housing member at a significantly lower pressure than heretofore considered feasible. Thus pressures as low as about 0.25 psi-50 psi can be employed. It will be recognized, however, that because of the flexibility in injection pressure offered by the moldable composition of this invention, higher pressures can be utilized if it is found convenient to do so, the point being that a minimum high pressure limitation (in the order of about 1000 psi) is not imposed on the present development. Further, the moldable outer bearing composition of the present invention is sufficiently flowable at ambient temperature that its injection at the stated low pressures can be effected at ambient temperature, thus eliminating the need for extraneous heating devices and controls to maintain the composition in a state suitable for injection at the stated low pressures.

If desired, the interior surface of the outer housing member can be treated to enhance the bonding of the moldable outer bearing composition therewith, such treatment including vapor blasting, chemical etching and the like. Importantly, however, it has been found that the moldable outer bearing member composition of this invention forms a bond with the outer housing member sufficiently strong without the need of a mechanical key or lock through the outer housing member so that in use there is no relative movement between the outer housing member and the molded outer bearing member.

The bearing assemly, after injection of the moldable outer bearing member into the space between the inner bearing member and the outer housing member is then cured. When it is desired to take advantage of the anaerobic characteristics of the acrylate composition, curing can be effected in an inert atmosphere essentially free from an oxygen-containing gas for a period ranging from about ¼ to 24 hours at a temperature ranging from about ambient temperature to 325°F. On the other hand, when it is not desired to cure the acrylate composition under anaerobic conditions, it has been found the same can conveniently be cured in the presence of an oxygen-containing gas at a temperature ranging from about 100°–325°F. for a period ranging from about ¼ to 2 hours. Generally, the use of lower temperatures requires a somewhat longer cure time.

In another embodiment of the present invention, the outer bearing member can be produced by applying the curable acrylate composition in the form of a slurry to the inner surface of the outer housing member, curing the same under the conditions set forth above and subsequently machining the cured composition to the desired dimensions and tolerances.

The bearing assembly of the present invention exhibits long life and low wear characteristics, is selflubricating and thus requires little or no servicing or maintenance, exhibits relatively high strength and load carrying characteristics. Further, unlike bearing assemblies utilizing nylon as a bearing member, the acrylate bearing member of the present invention exhibits no tendency to absorb moisture and thus is ideally suited for use in a moisture environment without any degradation of the bond created between the molded outer bearing member and the outer housing member.

Referring now to the drawings in which preferred embodiments of the invention are shown:

FIG. 1 is a sectional view illustrating the placement of the parts in a mold cavity to produce the bearing assembly of this invention;

FIG. 2 is a sectional view of the bearing assembly of the invention;

FIG. 3 is a fragmentary sectional view of one half of the bearing assembly of FIG. 2;

FIG. 4 is a fragmentary sectional view of the inner bearing member of the bearing assembly of this invention;

FIG. 5 is a perspective view of a rod end containing a bearing assembly embodying the present invention, parts of the rod end and bearing assembly being broken away;

FIG. 6 is a vertical sectional view taken through the rod end of FIG. 5; and

FIG. 7 is a fragmentary sectional view of one half of a bearing assembly construction illustrating another embodiment of the present invention.

FIG. 1 shows a mold in which the outer housing and inner bearing member are positioned during the injection of the curable acrylate composition into the clearance between the two members. The mold is comprised of upper and lower members 10 and 12, respectively, and is provided with filling orifice 14 which is in alignment with filling orifice 16 (approx. 0.08 inch in diameter) of the housing member 18. Located 180° from filling orifice 16 is vent orifice 20 (approx. 0.04 inch in diameter) in the housing member 18 aligned with vent orifice 21 of the mold. The inner bearing member 22 is centered within the housing member 18 by means of O-rings 24 and 26 to provide a clearance 28 therebetween. The mold members, the housing members and the centered inner bearing member can be retained in their relative positions by means of a bolt 29 passing through the base 10 and 12 of the assembly and fastened tight by nut 31. In forming the outer bearing member 30, the flowable mixture of curable acrylate composition and particulate solid lubricant is injected under relatively slight pressure at ambient temperature through the aligned filling orifices 14 and 16 to fill the clearance 28. This mixture can be injected into the clearance or cavity by mans of a syringe and its introduction is continued until it is visibly ejected through the vent orifices 20 and 21. The acrylate composition is then cured either (1) by placing the total mold assembly into an enclosure maintained with an essentially oxygen gas-free environment and at a temperature ranging from ambient temperature to 325°F, for a period ranging from about ¼ to 24 hours or (2) by placing the mold assembly in an enclosure maintained with an oxygen-containing gas environment and at a temperature ranging from about 100°-325°F, for a period ranging from about ¼ to 2 hours.

FIG. 2 shows one embodiment of the bearing assembly 23 of the present invention after being cured and removed from the mold assembly and as can be seen in FIG. 3, the minimum inner diameter of the housing member 18 can be less than the maximum outer diameter of the inner bearing member 22.

In FIG. 4 there is illustrated in detail the inner bearing member 22 having on the bearing surface engaging the molded outer bearing member 30 a thin film of parting or release agent 32 which is applied to the surface of the inner bearing member 22 prior to molding said outer bearing member thereabout. The inner bearing member 30 shown in FIG. 4 is one produced from a metal substrate 34 coated with a ceramic layer 36, each as hereinbefore defined.

FIGS. 5 and 6 show, by way of example, a rod end containing a bearing assembly of the present invention. The rod end is comprised of an externally threaded banjo 38 having a transverse bore which receives the bearing assembly of this invention, generally indicated at 23. The two coengaging and relatively slidable members of the bearing assembly consist of the inner ball member 22 and the outer molded plastic bearing member 30 which is in molded nonrotative engagement with outer housing member 18 which in turn is in fixed nonrotative engagement with the annular seating surface on the banjo 38 by swaging both sides of the housing member 18.

In use, the threaded portion of the banjo 38 is threadably connected with one mechanism part and another mechanism part is connected to the inner bearing member 22 by a connecting member inserted through its bore 29.

FIG. 7 shows another embodiment of the invention where the bearing assembly comprises an outer bearing housing 18, an outer molded plastic bearing 30, a split inner race 22 and an inner race through bushing 40. The outer plastic race 30 is molded between the housing 18 and inner bearing 22 in a manner essentially as described above so that while there is no relative movement between the outer bearing 30 and the outer race housing 18 there is relative movement between the outer bearing 30 and the inner bearing 22.

The inner side of the outer bearing 30 forms a pair of opposed annular bearing surfaces 42 and 44 having concave spherical curvatures which cooperate with the inner bearing 22 to permit relative sliding movement between the inner and outer bearing members even though the bearing is subjected to radial, axial and moment loading individually or in combination.

The split inner bearing member 22 comprises two annular members 46 and 48. These annular members are formed with hardened metal or with metal substrates coated with a ceramic material as disclosed heretofore. In the preferred form, the substrates 50, 52 are titanium and the ceramic coatings 54, 56 are chromium oxide. The outer bearing surfaces 54, 56 of each member 46, 48 of the inner bearing 22 are complementary to the annular bearing surfaces 42, 44 of the outer bearing 30 having spherical curvatures whereby the coengaging surfaces cooperate to form a bearing capable of absorbing radial, axial and moment loading individually or in combination.

The members 46 and 48 of the split inner bearing 22 are held in contact with the bearing surfaces 42, 44 of the outer bearing member 30 by means of a cylindrical bushing 40 which has an integral shoulder 58 at one end and a snapping or similar locking means 60 on the other end to retain the members on the bushing. The split inner bearing is press fit, bonded or otherwise secured to bushing 40 to prevent relative movement between the bushing and the inner bearing. It will be appreciated that complimentary conical rather than spherically curved bearing surfaces can be provided and that means equivalent to the split bearing bushing means 40 can also be utilized.

What is claimed is:

1. A method of producing a molded bearing assembly comprising two coengaging members movable relative to one another, the first of said members having a bearing surface selected from the group consisting of metal and ceramic and the bearing surface of said other member comprising a molded mixture of an acrylate composition and particulate solid lubricant, the bearing surface of said first member being coated with a thin film of a parting agent to prevent adhesion thereof to said molded bearing surface, the steps comprising coating said first bearing member with a thin film of a parting agent, applying a curable mixture of said acrylate composition and particulate solid lubricant to the parting agent coated first bearing member and curing said mixture in the absence of an oxygen-containing gas at a temperature ranging from ambient temperature to 325°F, thereby producing said other member and said molded bearing assembly, said acrylate composition comprising a mixture of an acrylate having the formula

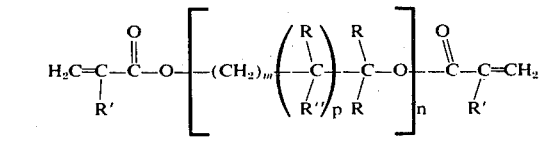

wherein R is selected from the group consisting of hydrogen, lower alkyl containing 1–4 carbon atoms, hydroxyalkyl containing 1–4 carbon atoms and

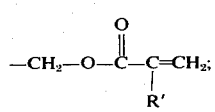

R' is selected from the group consisting of hydrogen, halogen and lower alkyl having 1–4 carbon atoms; R'' is selected from the group consisting of hydrogen, —OH and

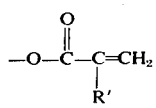

wherein R' has the meaning given above; m is an integer of 1–8; n is an integer of 1–20; and p is 0 or 1, with a catalytic amount of a hydroperoxide catalyst.

2. A method of producing a molded bearing assembly comprising two coengaging members movable relative to one another, the first of said members having a bearing surface selected from the group consisting of metal and ceramic and the bearing surface of said other member comprising a molded mixture of an acrylate composition and particulate solid lubricant, the bearing surface of said first member being coated with a thin film of a parting agent to prevent adhesion thereof to said molded bearing surface, the steps comprising coating said first bearing member with a thin film of a parting agent, applying a curable mixture of said acrylate composition and particulate solid lubricant to the parting agent coated first bearing member and curing said mixture in the presence of an oxygen-containing gas at a temperature ranging from about 100°–325°F, thereby producing said other member and said molded bearing assembly, said acrylate composition comprising a mixture of an acrylate having the formula

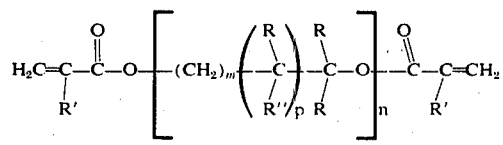

wherein R is selected from the group consisting of hydrogen, lower alkyl containing 1–4 carbon atoms, hydroxyalkyl containing 1–4 carbon atoms and

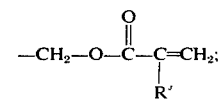

R' is selected from the group consisting of hydrogen, halogen and lower alkyl having 1–4 carbon atoms; R' is selected from the group consisting of hydrogen, -OH and

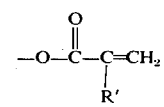

wherein R' has the meaning given above; m is an integer of 1–8; n is an integer of 1–20; and p is 0 or 1, with a catalytic amount of a hydroperoxide catalyst.

3. A method for producing a molded bearing assembly comprising two coengaging members movable relative to one another, the first of said members having a bearing surface selected from the group consisting of metal and ceramic and the bearing surface of said other member comprising a molded mixture of an acrylate composition which exhibits anaerobic curing characteristics and which is a liquid at ambient temperature and pressure and particulate solid lubricant, the bearing surface of said first member being coated with a thin film of a parting agent to prevent adhesion thereof to said molded bearing surface, the steps comprising coating said first bearing member with a thin film of a parting agent, applying a curable mixture of said liquid acrylate composition and particulate solid lubricant to the parting agent coated first bearing member and curing said mixture to produce said other member and said molded bearing assembly.

4. The method of claim 3 wherein said acrylate composition is applied to said parting agent coated first bearing member at ambient temperature.

5. The method of claim 4 wherein said acrylate composition is applied to said parting agent coated first bearing member by injection at a pressure as low as 0.25 lbs/in².

6. A method for producing a molded bearing assembly comprising two coengaging members movable relative to one another, the first of said members having a bearing surface selected from the group consisting of metal and ceramic and the bearing surface of said other member comprising a molded mixture of an acrylate composition which exhibits anaerobic curing characteristics and which is a liquid under ambient temperature and pressure and particulate solid lubricant, the bearing surface of said first member being coated with a thin film of a parting agent to prevent adhesion thereof to said molded bearing surface, the steps comprising locating said inner bearing member within an outer housing member with the spacing therebetween being sufficient so that on injection of said mixture of acrylate composition and particulate solid lubricant no appreciable separation of said particulate solid lubricant from the mixture occurs, coating the inner bearing surface with a parting agent, injecting said mixture of acrylate composition and particulate solid lubricant into said spacing and curing said mixture.

7. The method of claim 6 wherein the spacing between the inner bearing member and outer housing ranges between about 5–60 mils.

8. The method of claim 6 wherein said mixture is injected at a pressure between 0.25 – 1,000 psi.

9. The method of claim 6 wherein said mixture is injected at a pressure between 0.25–50 psi.

10. The method of claim 6 wherein said mixture is injected at ambient temperature.

11. The method of claim 6 wherein said mixture is cured in the presence of an oxygen-containing gas at a temperature ranging from about 100°–325°F for a period ranging from about ¼ to 2 hours.

12. The method of claim 6 wherein said acrylate composition comprises a mixture of an acrylate having the formula

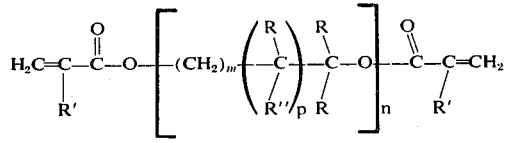

wherein R is selected from the group consisting of hydrogen, lower alkyl containing 1–4 carbon atoms, hydroxyalkyl containing 1–4 carbon atoms and

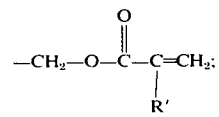

R' is selected from the group consisting of hydrogen, halogen and lower alkyl having 1–4 carbon atoms; R'' is selected from the group consisting of hydrogen, —OH and

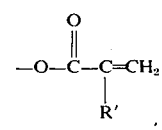

wherein R' has the meaning given above; $m$ is an integer of 1–8; $n$ is an integer of 1–20; and $p$ is 0 or 1, with a catalytic amount of a hydroperoxide catalyst and said mixture is cured in an inert atmosphere essentially free from an oxygen-containing gas for a period ranging from about ¼ to 24 hours at a temperature ranging from about ambient temperature to 325°F.

13. The method of claim 6 which also includes treating the interior surface of the outer housing member prior to injection of said mixture into said spacing to enhance the bonding of the moldable outer bearing composition therewith.

* * * * *